United States Patent [19]

Pehrson

[11] 4,240,208
[45] Dec. 23, 1980

[54] HAND-HELD LASER SURVEYING ROD

[75] Inventor: Marie S. Pehrson, Sparks, Nev.

[73] Assignee: John V. Pehrson, Sparks, Nev.

[21] Appl. No.: 81,027

[22] Filed: Oct. 1, 1979

[51] Int. Cl.³ .................. G01B 15/06; G01B 11/26
[52] U.S. Cl. .................................. 33/293; 33/296;
356/152; 356/400; 356/401
[58] Field of Search ............. 33/293, 294, 295, 296,
33/286; 356/152, 400, 401

[56] References Cited

U.S. PATENT DOCUMENTS

| | | | |
|---|---|---|---|
| 3,819,273 | 6/1974 | Unema et al. | 33/293 |
| 3,894,230 | 7/1975 | Rordan et al. | 356/400 |
| 3,972,622 | 8/1976 | Mason et al. | 33/293 |
| 4,029,415 | 6/1977 | Johnson | 33/294 |
| 4,030,832 | 6/1977 | Rando et al. | 33/293 |

Primary Examiner—Steven L. Stephan
Attorney, Agent, or Firm—Julian Caplan

[57] ABSTRACT

A telescoping surveying rod carries on its upper end a laser beam sensor which reacts to a rotating laser beam of conventional type located at a distance. The sensor preferably has a vertical, triangular cross-section piece which supports on each face three solar cells, each cell emitting a signal when the beam strikes it, depending upon whether the sensor is at above or below level. The sensor is actuated throughout 360° and hence need not be pointed at the beam source. An eye level readout device on the lowermost rod section has three lights which are illuminated depending upon which cell is energized. The rod is raised or lowered until the center light is illuminated, whereupon the rod marking indicates the distance below beam level of the foot of the rod.

6 Claims, 6 Drawing Figures

HAND-HELD LASER SURVEYING ROD

This invention relates to a new and improved hand-held laser surveying rod. More particularly, the invention relates to a telescopic surveying rod used to measure the distance below the level of the plane of rotation of a laser beam at various selected locations on a site.

One of the features of the invention is the fact that the rod is hand-held and is constructed in such manner that one man may survey an entire field. Readout of the distance below the plane of the laser beam is at eye level, conveniently at hand for logging in a surveying notebook.

Another feature of the invention is the fact that the sensor of the rod may be activated at any angle throughout 360°. It will be understood that a conventional rotating laser beam generator is used in conjunction with the rod. The beam establishes a plane a predetermined distance above the grade which is to be set and from which variations in grade may be measured. The laser instrument may be located anywhere within the field so long as it is above the elevation of the rod and there are no obstructions between the laser and the rod. Preferably the instrument is at the maximum elevation of the field.

A feature of the invention is the fact that the sensor has a polygonal (preferably, triangular) vertical member. On each face of the polygon are three vertically spaced apart solar cells. The cells of each level are wired in series. When the laser beam intercepts one of the cells, the cell emits a signal. If one of the uppermost cells is energized, this indicates that the rod is below the plane of the beam. If one of the center cells in energized, then the rod is at proper elevation. If one of the lower cells is energized, then the rod is above the plane of the beam. The operator raises or lowers the rod until one of the center cells is intercepted by the laser beam.

The readout at eye level is clamped to the lowermost section of the telescopic rod and has three lights which are illuminated depending upon which of the three layers of cells is energized.

A pointer is incorporated with the readout which indicates on the markings on the rod the distance below the laser plane. It will be understood that for this purpose the marking on the rod are reversed from normal rod markings.

These and other objects of the present invention will become apparent upon reading the following specification and referring to the accompanying drawings in which similar characters of reference represent corresponding parts in each of the several views.

Figure 1:
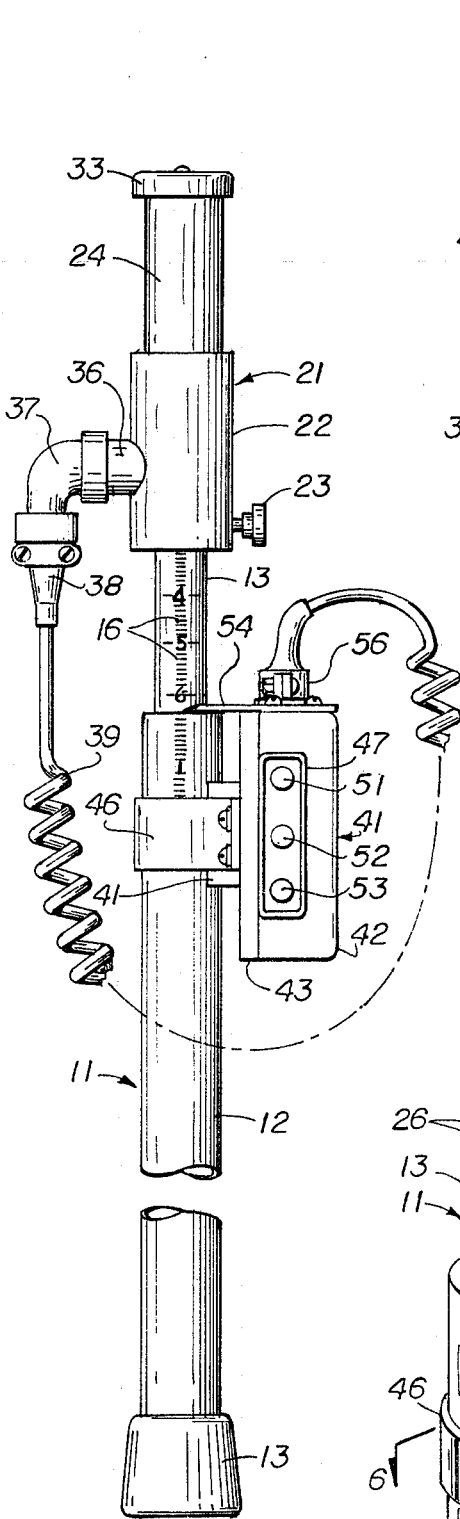
FIG. 1 is a side elevational veiw of the hand-held laser surveying rod, being partially broken away to conserve space.
Figure 2:
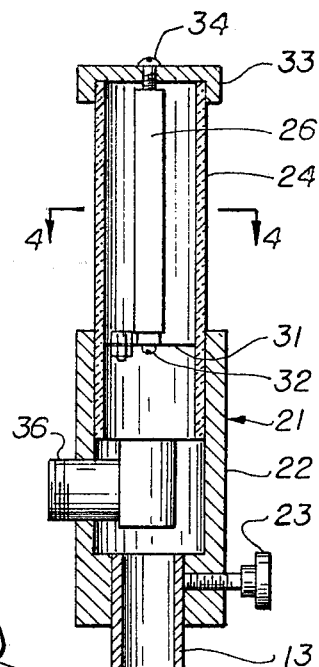
FIG. 2 is an enlarged vertical sectional view through the sensor on the top of the rod of FIG. 1.
Figure 4:
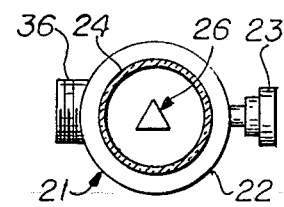
FIG. 4 is a cross-sectional view taken substantially along the line 4—4 of FIG. 2.
Figure 3:
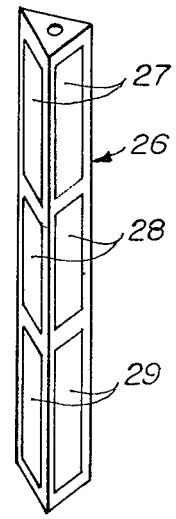
FIG. 3 is a perspective view of the triangular piece on which the solar cells are mounted.
Figure 5:
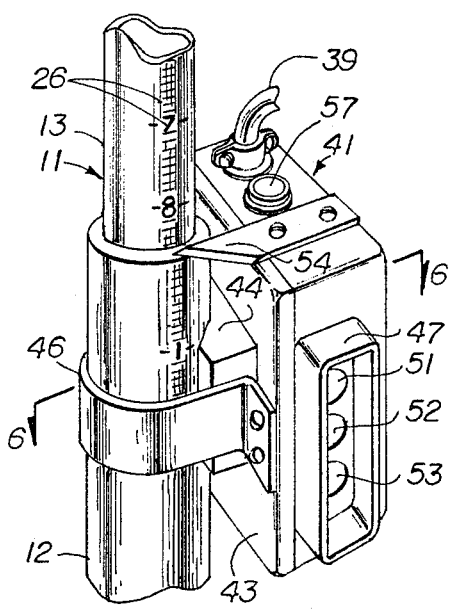
FIG. 5 is an enlarged perspective view of the readout portion of the structure of FIG. 1.
Figure 6:
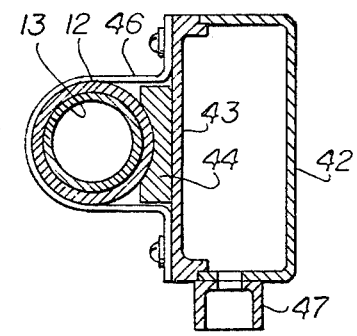
FIG. 6 is a horizontal sectional view taken substantially along the line 6—6 of FIG. 5.

Telescopic rod 11 herein illustrated is shown having a lowermost section 12 with a foot 13 on its lower end which rests upon the point whose elevation is being determined and an uppermost section 14 which telescopes into the lower section 12. It will be understood that more section may be added in a manner well understood in the surveying art. The markings 16 on the side of the rod sections 12, 14 are reversed from normal markings.

Mounted on the top of the uppermost section 13 is a detector 21, sometimes referred to herein as a sensor. Detector 21 has a base 22 formed with a socket at its lower end to receive the top of section 13. Set screw 23 threaded into base 22 secures the detector 21 in place on the upper half of the rod 13. On the top of base 22 and partially received therein is a clear cylindrical window 24. Within the window 24 is a triangular piece 26 of brass or other suitable metal. It will be understood that the selection of a triangle is for convenience and that a greater number of sides may be formed on the piece 26, the object being that the piece 26 receives the laser beam from any angle.

On each face of piece 26 is an upper cell 27 and below cell 27 is a center cell 28 and a lower cell 29. A typical suitable solar cell is number 21S462 silicon photocell as manufactured by Vactec, Inc. of St. Louis, MO. Such cells are activated by the laser beam but not by sunlight or other illumination likely to be encountered in the field. Impingement of a laser beam on one of the cells will cause it to emit a signal as is well understood in the solar cell art. The piece 26 is supported on the top of the detector 21 by a spacer 31 fixed to the inside of the window 24. Screw 31 through the spacer 31 is threaded into the lower end of the piece 26. The upper end of piece 26 is held by cap 33 on the top of window 24, there being a screw 34 threaded into the upper end of the piece 26.

A nipple 36 is attached to a central bore in the base 22 so that wires connected to the various solar cell may be conducted away in a weather-tight fashion. Preferably an elbow 37 is threaded onto the nipple 36 and is connected in turn to a fitting 38 through which extends a coil cord 39 which leads down to the readout 41.

Readout 41 comprises a box 42 closed with a cover 43. Within the box 42 is a source of power and electrical components for the unit. On the outside of cover 43 is a rod contactor 44 which is concave and shaped to fit tightly against the lowermost rod section 12. Strap 46 passes around the outside of the rod 12 and is fastened at each of its ends to the cover 43.

On one vertical face of box 42 is a sensor shroud 47 and within the shroud 47 are three lights 51, 52, and 53. The shroud makes it more convenient to determine, in bright sunlight, which light is illuminated. Preferably the center light 52 is green and the upper and lower lights 51 and 53 are red. Extending out from the top of the box is a pointer 54 which has an outer point in close proximity to the markings 16 of the rod immediately inside lowermost rod 12 (here shown to be the uppermost rod 13 since there are only two rods illustrated). The lower end of cord 39 is received inside the box 42 with a connector 56, insuring a weather-tight connection.

Preferably a leveled vial 57 is located on the top of the box 42 whereby the user may insure that the rod 11 is vertical.

In the use of the device, preliminarily a laser instrument (not shown) of any type which emits a beam, revolving in a plane of desired grade and elevation is placed at an elevated position in the field to be surveyed.

The surveyor then moves the rod 11 from place to place to determine the distance below the plane of the laser beam of each point where the foot 13 is placed. The telescopic rod is first adjusted so that the laser beam intercepts the window 24. This can usually be done by visual observation. The rod 11 is held so that the bubble in the vial 57 is centered, indicating that the rod 11 is vertical. The beam then intercepts one of the nine solar cells within the sensor. If one of the upper cells 27 is intercepted, then the light 53 is illuminated. The user then raises the rod 13 until illumination of the green light 52 indicates that one of the center cells 28 has been intercepted by the laser beam. Similarly, energization of one of the cells 29 causes illumination of the red light 51 and indicates that the rod should be lowered. When the green light 52 is illuminated, the user with the use of the pointer 54 reads the marking 16 on the rod section 13 and this indicates the distance below the plane of the laser beam of the ground upon which the foot 13 rests.

The surveyor moves from point to point on the field marking the elevation at each point, operating the device in the same manner as has been explained.

It will be seen that a single surveyor may survey the level of an entire field or that several surveyors using indentical rods may operate at the same time.

What is claimed is:

1. A surveying rod for use with a laser beam rotatable in a plane comprising a telescopic rod having an upper section and a lower section, each said section having height markings, a sensor attached to the upper end of said upper section, said sensor having a base having a socket for said upper end, a vertical piece mounted relative to said base, said base having a plurality of upper solar cells all at the same elevation, a plurality of center solar cells at the same elevation and below said upper cells and a plurality of lower solar cells at the same elevation and below said center cells, a readout on the upper end of said lower section, said readout comprising a box, three vertically spaced lights mounted on said box and a pointer positioned to point to said height markings, and electrical means interconnecting said sensor and said readout to illluminate one said light when said beam intercepts one of said upper cells, a second said light when said beam intercepts one of said center cells and a third said light when said beam intercepts one of said lower cells.

2. A rod according to claim 1 in which said sensor further comprises a cylindrical transparent window around said piece.

3. A rod according to claim 1 in which said piece is of polygonal cross section rod having plural vertical faces, there being one each of said upper, center and lower cells on each said face.

4. A rod according to claim 3 in which said rod is of conductive metal.

5. A rod according to claim 1 in which said box has a cover, a concave rod contactor engaging one side of said lower section and a strap around the opposite side of said lower section and fixed to said cover.

6. A rod according to claim 1 which further comprises a level-indicating vial on top of said box.

* * * * *